March 18, 1924.
W. ROHRBACH
BIRD NEST
Filed Sept. 12, 1923
1,487,269
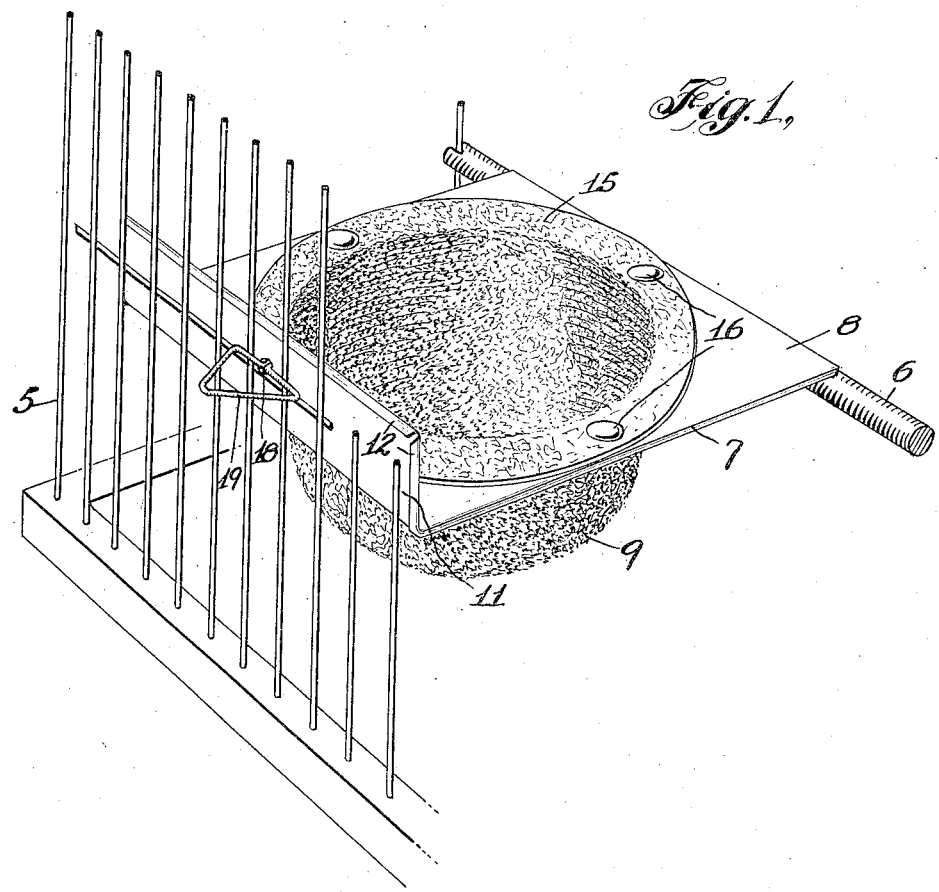
Fig. 1,
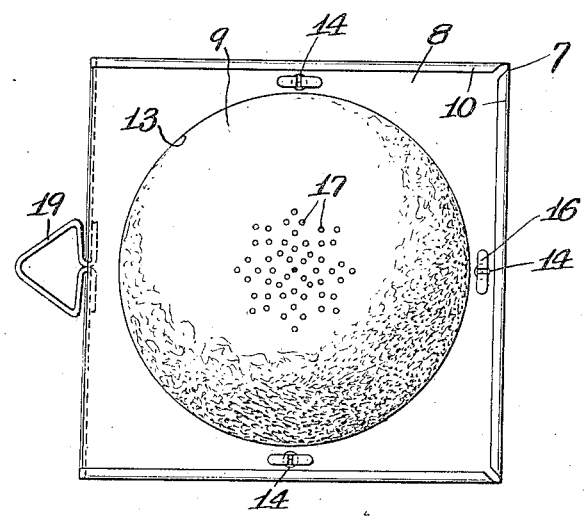
Fig. 2,
INVENTOR
William Rohrbach
BY
Howard E. Thompson
ATTORNEY Patented Mar. 18, 1924.

1,487,269

UNITED STATES PATENT OFFICE.

WILLIAM ROHRBACH, OF GLENDALE, NEW YORK.

BIRD NEST.

Application filed September 12, 1923. Serial No. 662,165.

*To all whom it may concern:*

Be it known that I, WILLIAM ROHRBACH, a citizen of the United States, and residing at Glendale, Long Island, in the county of Queens and State of New York, have invented certain new and useful Improvements in Bird Nests, of which the following is a specification, such as will enable those skilled in the art to which it appertains to make and use the same.

This invention relates to bird nests and particularly to devices of this class designed to be mounted in connection with bird cages and the like to be used in the breeding of birds of various kinds and particularly canaries; and the object of the invention is to provide a nest of the class and for the purpose specified composed of a metallic part fashioned to form a platform and a flange extending at right angles to one side of the platform, said platform being apertured and a nest proper composed of pressed felt concavo-convex in cross section and which is detachably secured to the platform; a further object being to provide the bottom of the nest proper with a plurality of small apertures thereof affording ventilation to the nest to facilitate the hatching of eggs in an efficient and practical manner; and with these and other objects in view the invention consists in a device of the class and for the purpose specified which is simple in construction and efficient in use and which is constructed as hereinafter described and claimed.

The invention described and claimed herein is an improvement on that shown and described in a prior application for a patent filed by me January 3, 1923, Ser. No. 610,408, and is fully disclosed in the following specification, of which the accompanying drawing forms a part, in which the separate parts of my improvement are designated by suitable reference characters in each of the views, and in which:—

Fig. 1 is a perspective view of a part of a bird cage and showing my improved nest mounted in connection therewith; and, Fig. 2 a bottom plan view of the nest detached.

In Fig. 1 of the drawing, I have shown for the purpose of illustrating one use of my invention, a part of a bird cage 5 and 6 represents the usual perch rod in cages of the class under consideration and at 7 I have shown one of my improved bird nests.

The nest 7, in the construction shown, is composed of two parts, namely, a metallic part 8 and a fibrous part 9. The part 8 is substantially rectangular in form and three of the edges of which are turned downwardly and inwardly as shown at 10, while the other edge is turned upwardly to form a comparatively wide flange 11, the edges of which are also turned inwardly as shown at 12 in Fig. 1 of the drawing. The in-turned edges 10 and 12 form rounded or finished edges for the entire part 8 as will be apparent.

The main body portion of the part 8 constitutes a platform for the nest and is provided with a large circular aperture 13 and with a plurality of smaller apertures 14 arranged about the periphery of the aperture 13.

The part 9 is preferably cup-shaped or concavo-convex in form and provided at its periphery with an annular flange 15. The part 9 forms the nest proper and is preferably pressed from felt or similar fibrous material and in connecting the separate parts 8 and 9 the concavo-convex portion of the part 9 is passed downwardly through the aperture 13 and brads 16 are passed through the flange 15 of the part 9 and through the apertures 14 to secure the separate parts 8 and 9 together. The central bottom portion of the part 9 is provided with a plurality of small and spaced apertures 17 which provide ventilation for the nest especially in the hatching of eggs therein.

The flange 11 of the part 8 is provided centrally with a small aperture 18 through which is passed the ends of a substantially V-shaped keeper 19 adapted to retain the nest 7 in predetermined position when mounted in the cage 5 as clearly shown in Fig. 1 of the drawing.

The distinctive feature of my present invention over that shown in the application above referred to, resides in the unitary formation of the part 8 which is constructed of a single piece of sheet metal fashioned to form the platform proper and the flanged portion 11 which materially reduces the cost of producing the entire device and also facilitates the production of the devices, and while I have shown a specific form of construction in carrying my invention into effect, it will be understood that I am not necessarily limited to the construction herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. A nest of the class described composed of two parts, one of said parts being fashioned from sheet metal and being rectangular in form and provided at one side with an upstanding flange portion and centrally thereof with a large aperture and the other part being fashioned from fibrous material to the form of a cup-shaped body adapted to be inserted into the aperture of the first named part and said last named part having a peripheral flange which rests upon the top face of the platform, and said plaform being provided about the periphery of the aperture therein with spaced apertures, and fastening devices passed through the flange of the last named part and said last named apertures for securing the separate parts together.

2. A nest of the class described composed of two parts one of said parts being fashioned from sheet metal and being rectangular in form and provided at one side with an upstanding flange portion and centrally thereof with a large aperture and the other part being fashioned from fibrous material to the form of a cup-shaped body adapted to be inserted into the aperture of the first named part and said last named part having a peripheral flange which rests upon the top face of the platform, said platform being provided about the periphery of the aperture therein with spaced apertures, fastening devices passed through the flange of the last named part and said last named apertures for securing the separate parts together, and the flange portion of the first named part being provided with an apertures, and an attaching device rotatably mounted in said last named aperture.

3. A nest of the class described composed of two parts, one of said parts being fashioned from sheet metal and being rectangular in form and provided at one side with an upstanding flange portion and centrally thereof with a large aperture and the other part being fashioned from fibrous material to the form of a cup-shaped body adapted to be inserted into the aperture of the first named part and said last named part having a peripheral flange which rests upon the top face of the platform, said platform being provided about the periphery of the aperture therein with spaced apertures, fastening devices passed through the flange of the last named part and said last named apertures for securing the separate parts together, the flange portion of the first named part being provided with an aperture. and attaching device rotatably mounted in said last named aperture, and the cup-shaped portion of the second named part being provided with a plurality of small apertures.

In testimony that I claim the foregoing as my invention I have signed my name this 10th day of Sept., 1923.

WILLIAM ROHRBACH.